Feb. 4, 1969 G. D. FITZHUGH 3,425,087
BEATER BLADE MOUNTING ADAPTERS FOR WORKING
IMPLEMENTS OR THE LIKE
Filed Jan. 28, 1966
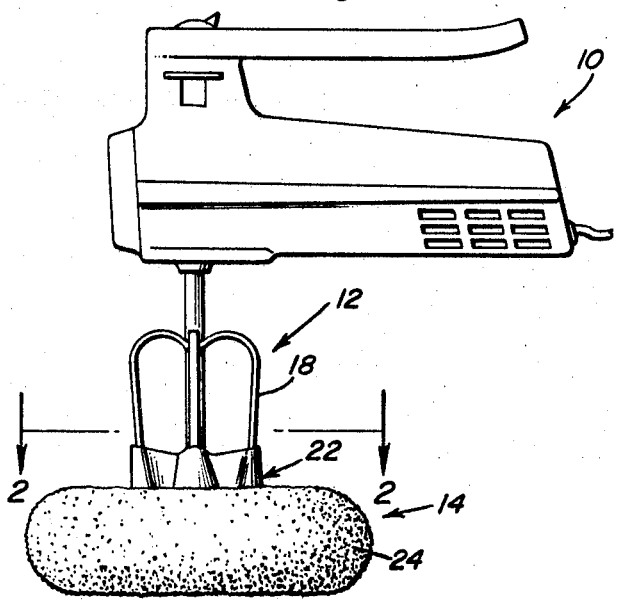
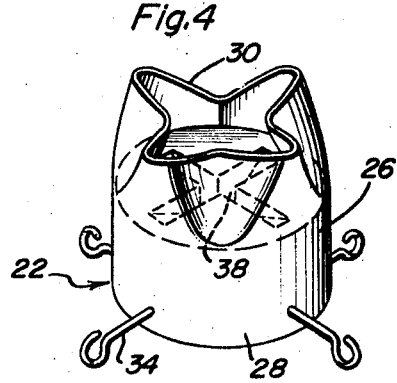
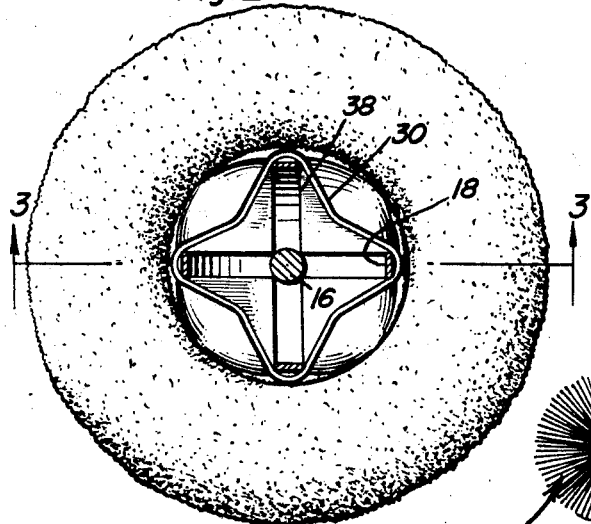
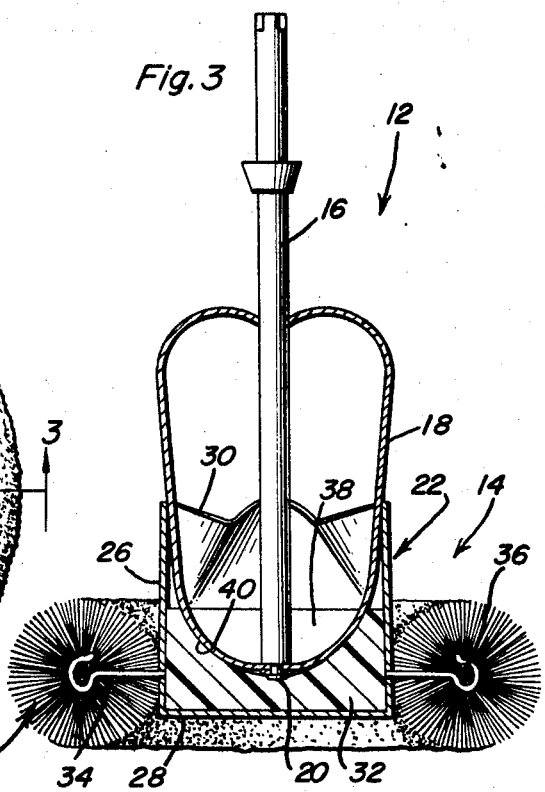
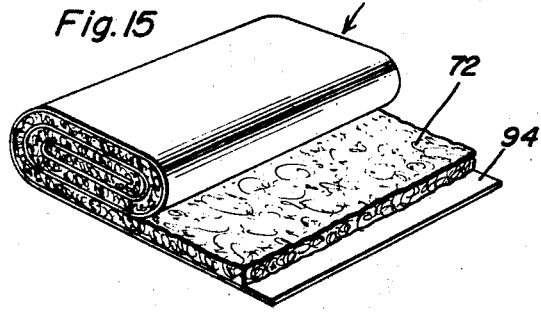
Guy D. Fitzhugh
INVENTOR.

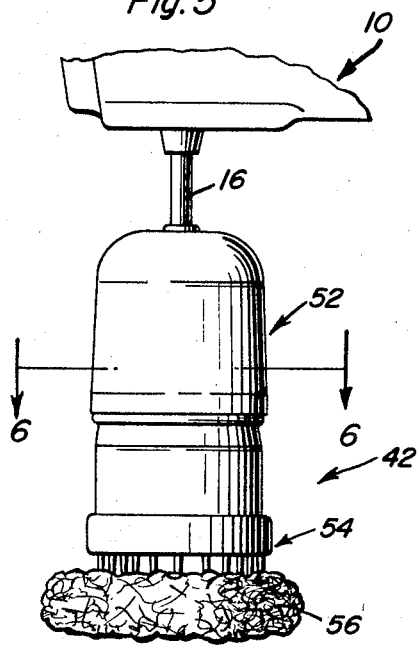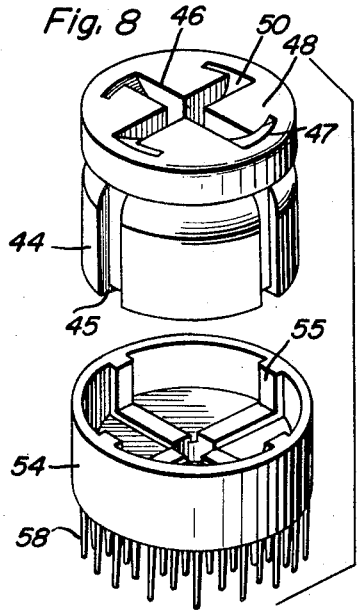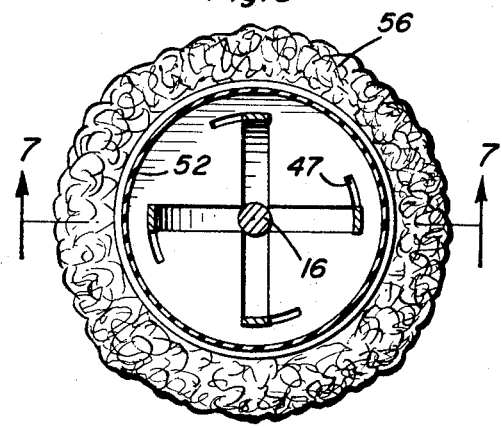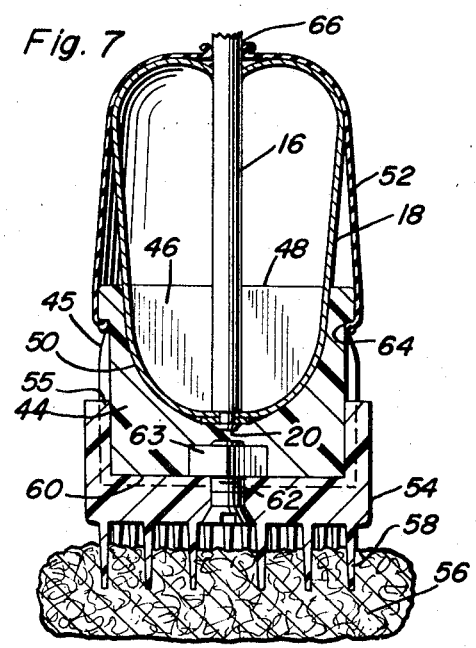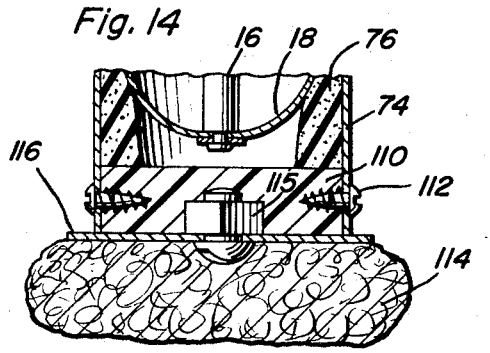
Guy D. Fitzhugh
INVENTOR.

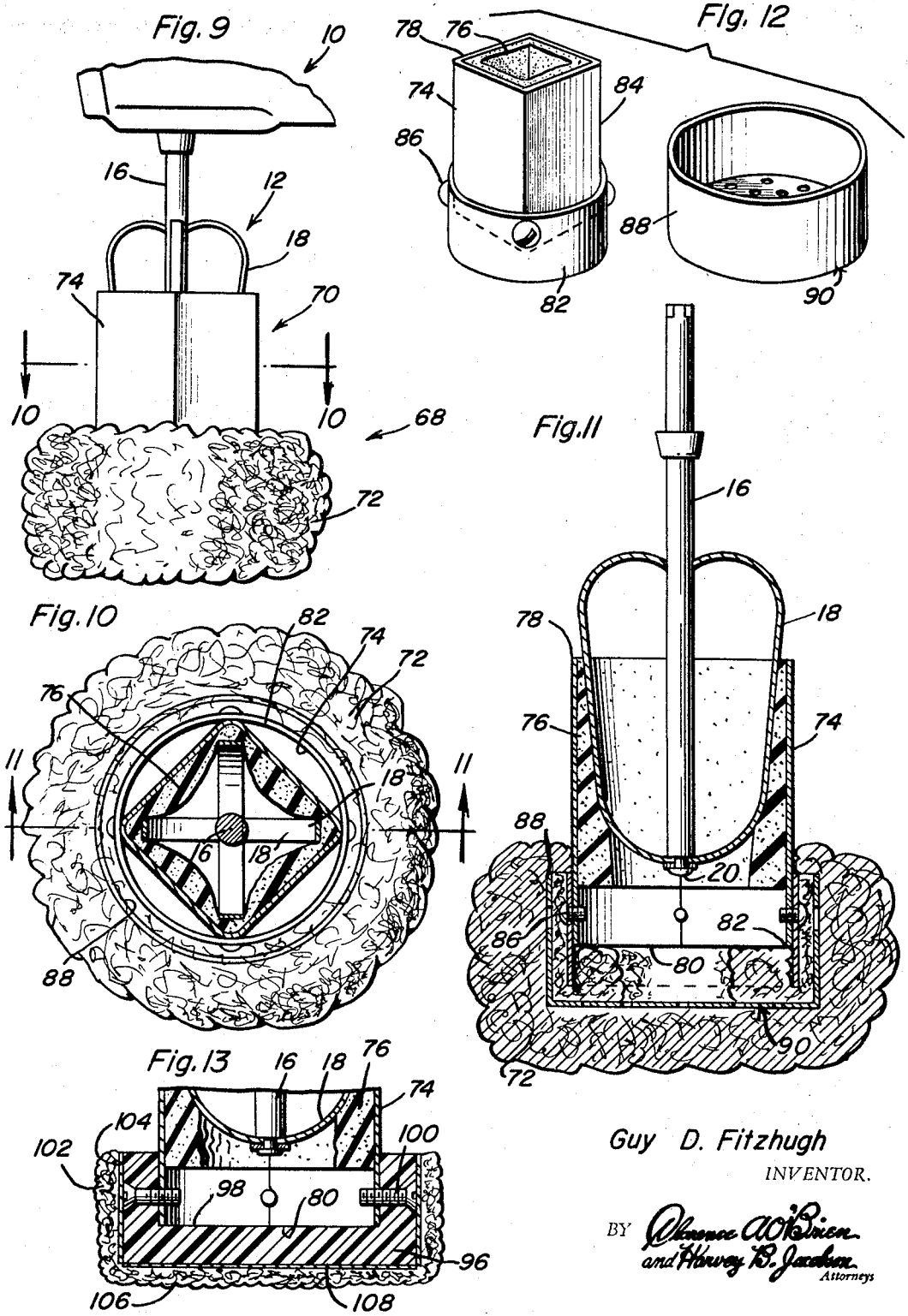

United States Patent Office 3,425,087
Patented Feb. 4, 1969

3,425,087
BEATER BLADE MOUNTING ADAPTERS FOR WORKING IMPLEMENTS OR THE LIKE
Guy D. Fitzhugh, P.O. Box 6053, Pine Bluff, Ark. 71601
Filed Jan. 28, 1966, Ser. No. 523,607
U.S. Cl. 15—230.19    20 Claims
Int. Cl. B05c *1/06;* A47l *17/00;* A46b *13/02*

ABSTRACT OF THE DISCLOSURE

An adapter for a conventional beater blade assembly by means of which a working implement may be mounted for use. The adapter body is provided with positive torque transmitting formations that engage the beater between its blades and also engage the blades along contact surfaces conforming to the curvature of the blades with which they are held in contact.

---

This invention relates to the attachment of cleaning or abrasive devices to power driven implements such as mixer beater blades.

It is therefore a primary object of the present invention to provide an adapter which may extend the utility of power driven blades or the like by conversion thereof into a power operated working device. In accordance with this object, an abrasive cleaning implement may be readily attached to the usual beater blades of a portable, power operated mixer for household or cleaning purposes.

An additional object of the present invention is to provide an adapter attachment for power operated beater blades through which torque is transmitted to a working implement in a positive manner without any likelihood of the beater blades being ruptured or deformed as a result of the substantial torque and axial loads applied thereto.

Although the attachment of cleaning implements to beater blades has already been proposed as disclosed in patent No. 3,186,020, issued June 1, 1965, to Redfield, such prior attachments or adapters did not take into account the likelihood that the torque and axial loading imposed on the beater blades would exceed the loading usually experienced during use of the blades for the originally intended purpose. Accordingly, it is a further object of the present invention to insure that the beater blades will not become detached from the shank or drive shaft when subjected to loads considerably higher than the loads for which the blades were designed.

A still further object of the present invention is to provide an attachment or adapter for the power driven beater blades of a mixer whereby different types of abrasive cleaning devices and materials may be driven, the adapter having protective facilities for the beater blades so as to avoid marring, rupture, deformation or detachment thereof from the power shaft to which the blades are attached.

Yet another object of the present invention is to provide in combination with the aforementioned adapters, facilities for removably mounting abrasive cleaning devices or materials.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a typical portable, power operated mixer assembly having a cleaning attachment mounted on the beater blades in accordance with the present invention.

FIGURE 2 is a top sectional view taken substantially through a plane indicated by section line 2—2 in FIGURE 3.

FIGURE 3 is a side sectional view taken substantially through a plane indicated by section line 3—3 in FIGURE 2.

FIGURE 4 is a perspective view showing the adapter associated with the cleaning attachment of FIGURES 1–3.

FIGURE 5 is a side elevational view of another form of cleaning attachment made in accordance with the present invention.

FIGURE 6 is a sectional view taken substantially through a plane indicated by section line 6—6 in FIGURE 5.

FIGURE 7 is a sectional view taken substantially through a plane indicated by section line 7—7 in FIGURE 6.

FIGURE 8 is a perspective view of the adapter associated with the attachment of FIGURES 5–7.

FIGURE 9 is a side elevational view of a third form of cleaning attachment made in accordance with the present invention.

FIGURE 10 is a sectional view taken substantially through a plane indicated by section line 10—10 in FIGURE 9.

FIGURE 11 is a sectional view taken substantially through a plane indicated by section line 11—11 in FIGURE 10.

FIGURE 12 is a perspective view of the adapter and removable mounting device associated with the attachment shown in FIGURES 9–11.

FIGURE 13 is a partial side sectional view of the attachment with another form of removable mounting device for abrasive material.

FIGURE 14 is a partial side sectional view corresponding to FIGURES 11 and 13 but showing another form of adapters and abrasive cleaning devices associated therewith.

FIGURE 15 is a perspective view showing the packaging of abrasive material utilized in connection with the removable mounting device illustrated in FIGURES 9–12.

Referring now to the drawings in detail, and initially to FIGURE 1, it will be observed that the present invention is particularly, although not necessarily, useful in connection with a portable-type of power mixer 10 with which a mixing beater 12 is associated. In order to utilize the power mixer for cleaning such items as pots and pans, a cleaning attachment 14 is mounted on the beater 12, it being appreciated of course that attachments other than cleaning implements may also be mounted on the beater in accordance with the present invention.

Referring now to FIGURES 2, 3 and 4, it will be observed that the attachment 14 is designed for mounting on the usual mixer beater having an elongated drive shaft or shank 16 adapted to be inserted into the housing of the power mixer. The beater includes a plurality of blade strips 18 which intersect at one end of the shank 16 and are attached thereto by means of a fastener rivet 20 for example, the ends of the blade strips also being anchored as by welding to the shank in spaced relation to the fastener rivet 20 so that each blade strip is supported on the shank with a predetermined curvature. In the illustrated embodiment, the beater consists of four blade strips arranged on the shank at 90° angles to each other.

The beater blades are received within an adapter assembly generally referred to by reference numeral 22 on which any suitable working implement may be removably mounted such as the annular brush device 24. The adapter assembly consists of a tubular member or housing 26 having a mounting base portion 28 and an inwardly crimped retainer grip portion 30 which is elastically yieldable in order to frictionally grip the blade strips 18 when the beater is fully seated within the adapter body. The mounting base portion of the tubular member is rigidified by a body or core 32 made of rigid material having an outer surface conforming to the internal cross-section of the tubular member 26. In the illustrated embodiment of FIGURES 1–4, the cross-sectional shape of the mounting portion is circular, it being appreciated of course that other cross-sectional configurations may be utilized. Also, the base portion 28 of the tubular member may mount a plurality of radially projecting hooks 34 by means of which the twisted annular core 36 of the brush device 24 may be firmly supported as more clearly shown in FIGURE 3.

The tubular member 26 and the core 32 form a cavity within which the blades 18 of the beater are received for a substantial distance from the end of the shank 16 to which the blades are attached by the fastener 20. The grip portion 30 of the tubular member therefore frictionally engages the blades in axially spaced relation to the end of the shank in order to effectively resist withdrawal of the beater from the cavity of the adapter body as well as to protectively enclose a substantial portion of the blades. Torque is however transmitted from the blades to the adapter body 22 by the formation of slots 38 within the core 32, the slots intersecting each other at a 90° angle in order to receive the blade strips 18 which extend from the shank 16 at 90° to each other. Accordingly, the width of the slots 38 are substantially equal to the width of the blade strips 18 for reception thereof. Also, the parallel side walls of the slots 38 are interconnected by blade engaging surfaces 40 which conform to the curvatures of the blade strips in contact therewith as shown in FIGURE 3. Thus, while the blade strips transmit torque to the adapter body through the parallel side walls of the slots 38, the surfaces 40 thereof resist deformation of the blade strips from the original curvature thereof in order to minimize or prevent concentration of stresses that could rupture the attachment of the blades to the shank under the relatively severe torsional and axial loading imposed on the blades.

Referring now to FIGURES 5 through 8, another form of cleaning attachment 42 is shown mounted on the same type of beater 12 powered by the portable mixer 10. The attachment 42 consists of a rigid adapter body 44 made of a suitable material such as plastic within which intersecting slots 46 are formed opening at one axial end 48 thereof, the slots 46 being similar in configuration and function to the slots 38 described in connection with FIGURES 1–4 except that they may extend a greater axial distance along the shank 16 when receiving the beater blades 18 therein. Accordingly, torque is transmitted from the beater blades to the adapter body 44 through the parallel side walls of the slots 46 which are also provided with blade-engaging surfaces 50 conforming to the curvature of the blade strips.

Also associated with the attachment 42, is a blade protecting retainer 52 and a holder 54 for a scouring pad 56. It will be observed that the holder 54 is provided with a plurality of projecting prongs 58 so as to grip the scouring pad and may be secured to the base end 60 of the adapter body 44 in any suitable fashion as for example by the fastener 62. It will also be appreciated, that the holder 54 could be cast integral with the adapter body if desired and that other types of cleaning implements could be attached to the adapter body. The adapter body is also formed adjacent the end 48 thereof, with an annular anchoring formation 64 by means of which one end of the retainer 52 is attached.

As shown in FIGURE 7, the retainer 52 completely envelops the portion of the beater blades 18 projecting from the cavity of the adapter body and is therefore provided with an opening 66 through which the shank 16 of the beater extends. The retainer 52 may be made of a relatively thin, elastically flexible material such as rubber expanded to firmly embrace the blades 18 and the portion of the body 44 to which it is anchored. In this fashion, the retainer envelope 52 will not only protectively enclose the beater blades but will also yieldably resist withdrawal of the beater from the cavity of the adapter body within which it is seated.

FIGURES 9 through 11 illustrate a still further form of attachment generally referred to by reference numeral 68 made in accordance with the present invention. The attachment 68 includes an adapter body 70 within which the beater blades 18 are received and on which an abrasive material 72 such as steel wool is replaceably mounted. The adapter body consists of an axially elongated tubular member 74 the cross-section of which is polygonal in shape such as the square configuration shown in the illustrated embodiment. The cross-sectional dimension of the tubular member is also selected so as to accommodate limited angular displacement relative thereto by the beater blades 18 as more clearly shown in FIGURE 10, when the beater is received within the cavity formed by the tubular member. The tubular member is also internally lined with a shock-absorbing spacer 76 made of a suitable material such as a plastic foam which conforms to the curvature of the blades when engaged therewith as shown in FIGURE 11. The spacer 76 serves a dual function of yieldably resisting the limited angular displacement between the beater blades 18 and the internal surfaces of the tubular member 74 in place of the rigid bodies 32 or 44 hereinbefore described as well as to cooperate with the tubular member 74 to form a retaining wedge adjacent the axial end 78 of the tubular member in order to frictionally resist withdrawal of the beater blades 18 from the adapter body 70.

The tubular member 74 may be rigidified adjacent the axial end 80 opposite the end 78 by means of a mounting base or core in the form of an annular element 82 having a cross-sectional configuration such as the circular shape illustrated which circumscribes and hence engages the corners 84 of the tubular member 74 thereby preventing cross-sectional deformation of the tubular member. The annular element 82 is also secured to the tubular member by means of fasteners 86 in order to prevent any relative angular displacement and forms a base for the mounting of abrasive material. As illustrated in FIGURES 10, 11 and 12, the abrasive material 72 or steel wool envelops a cup member 90 and is removably mounted on the element 82 by clamping thereof between the annular element and the annular wall 88 of a cup member. The annular wall 88 is therefore radially spaced from the annular element 82 when clamping the material 72 onto the rigidified end portion of the tubular member. It will also be apparent, that a sheet of steel wool 72 may be simply inserted between the cup member 90 and the annular element 82 before the cup member is axially assembled onto the element 82 as shown in FIGURE 11 resulting in the clamping of a portion of the steel wool between the annular element 82 and the cup member. The steel wool or other such abrasive material may therefore be conveniently marketed for use in connection with the attachment 68 by packaging thereof in an arrangement 92 shown in FIGURE 15 wherein an elongated sheet of the material 72 is coiled about itself by use of a flexible backing sheet 94.

The axial mounting end 80 of the tubular member 74 may also be rigidified in accordance with the modification illustrated in FIGURE 13 wherein a rigid plastic block 96 is provided having a recess 98 the walls of which conform to the cross-sectional configuration of the tubular member 74 in order to receive the mounting end portion thereof. The block 96 may be secured to the tubular member by the fasteners 100 and may also mount abrasive material 102 on an annular mounting strip 104 and/or abrasive material 106 on a circular mounting disk 108.

A still further modification is illustrated in FIGURE 14 whereby the axial mounting end of the tubular member 74 is rigidified by a rigid block 110 received internally of the tubular member and secured thereto by the fasteners 112. A scouring pad 114 may therefore be mounted on the tubular member by means of the block 110 to which the pad backing disk 116 is secured in any suitable fashion. In this form of attachment, the block 110 will also axially abut the spacer 76 aforementioned in connection with FIGURES 9 through 12.

It will be appreciated from the foregoing description, that several forms of attachments are described each of which embodies certain features which may be interchanged with features of other forms. The type of working device or material and associated mounting facilities could be interchanged amongst the different types of adapters so that the replaceable clamping of steel wool by the cup member 90 as described in connection with FIGURES 9-12, for example, could be applied to the adapter body 22 illustrated in FIGURES 1-3 in place of the hooks 34 or to the adapter body 44 illustrated in FIGURES 5-7 in place of the holder 54. Similarly, the removably mounted abrasive material such as illustrated in FIGURES 13 or 14 could be applied to the adapter bodies of any of the other illustrated forms of the invention. The same is true with respect to the pad holder 54 of FIGURES 5-7 and the annular brush device 24 of FIGURES 1-3. It will also be apparent that the yieldable retainer features as respectively described in connection with FIGURES 1-3 and FIGURES 5-7, could be interchanged as well as applied to the form of the invention illustrated in FIGURES 9-11. Although all of the possible combination of features resulting from the foregoing interchanges have not been specifically illustrated as such, it should be appreciated that they are contemplated separate forms or species of the invention. Common however to all of the forms of the invention, is the provision of an adapter body through which torque is transmitted from the beater blades to some sort of working device or material removably mounted on the adapter body having at least a portion thereof rigidified for firm and proper mounting of the working device or material. Each form of the invention furthermore provides both a protective enclosure for a substantial portion of the beater blades and yieldable retaining means preventing withdrawal of the beater blades from the cavity of the adapter body. Each adapter body also has facilities for preventing development of stresses within the beater blades capable of rupturing the connections thereof to the power driven shank because of the torsional and axial loading imposed in excess of the maximum loading for which the blades are ordinarily designed.

Exemplary of the various features which can be incorporated into the various forms of the device is the embedded nut 63 in FIGURE 7 or the nut and screw assembly 115 in FIGURE 14. This enables any of the attachments to be fixedly but releasably secured on any of the adapters. Also, as illustrated in FIGURE 8, the slots 46 are communicated with laterally extending slots or grooves 47 to lockingly receive blades 18 when twisted in relation to the beater 12. For positively driving the holder 54 from body 44, the holder 54 is provided with transversely extending ribs 55 and the body 44 is provided with grooves 45 which interfit therewith. Both the grooves 45 and ribs 55 extend up the sides of the body and holder respectively to provide a positive drive connection. The locking grooves 47, driving ribs 45 and ribs 55 may be used on various forms of the invention. Also, the cover 52 may be used on various forms of the invention and all forms may be constructed of plastic material.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A mounting attachment for a beater having a shank and a plurality of blades of a predetermined curvature interconnected in intersecting relation to one end of the shank, comprising a body having a torque transmitting cavity receiving said beater in surrounding relation to said blades for a substantial axial distance from said one end of the shank, retaining means engageable with the blades in spaced relation to said one end of the shank in order to yieldably resist axial withdrawal of the beater from said body and blade engaging means projecting from said body radially inward between the blades and having portions conforming to and contacting the external curvature of the blades while transmitting torque to the body, whereby deformation of the blades from said curvature is resisted.

2. The combination of claim 1 wherein said cavity is formed by intersecting slots of a width substantially equal to said blades, said blade engaging means forming rigid blade engaging surfaces in said slots having curvatures conforming to the curvatures of the blades in contact therewith.

3. The combination of claim 2 wherein said retaining means comprises a flexible envelope enclosing the blades, said envelope having an opening through which the shank extends in axially spaced relation to the body, and annular anchoring means formed on the body for securing the envelope thereto.

4. The combination of claim 1 wherein said retaining means comprises a flexible envelope enclosing the blades, said envelope having an opening through which the shank extends in axially spaced relation to the body, and annular anchoring means formed on the body for securing the envelope thereto.

5. The combination of claim 1 wherein said retaining means comprises a tubular housing mounting said body adjacent one axial end thereof, said housing having an elastically yieldable grip portion frictionally engaging the blades in axially spaced relation to the body.

6. The combination of claim 5 wherein said cavity is formed by intersecting slots of a width substantially equal to said blades, said blade engaging means forming rigid blade engaging surfaces in said slots having curvatures conforming to the curvatures of the blades in contact therewith.

7. The combination of claim 1 wherein said body comprises a tubular member having a predetermined cross-sectional shape, core means connected to one axial end of the tubular member for cross-sectionally rigidifying the tubular member adjacent said one end, said cross-sectional shape of the tubular member adjacent said one end forming said cavity of a dimension limiting angular displacement of the blades relative thereto.

8. The combination of claim 7 wherein said blade engaging means comprises a shock-absorbing spacer lining the tubular member in engagement with the blades to yieldably resist any limited relative displacement thereof.

9. The combination of claim 8 wherein said retaining means comprises end portions of said spacer and the tubular member adjacent an axial end opposite said one axial end to which the core means is secured.

10. The combination of claim 9 wherein said core means comprises an annular element having an internal cross-section circumscribing the cross-sectional shape of the tubular member, and fastener means connecting the annular element to the tubular member for preventing relative angular displacement.

11. The combination of claim 10 including a cup member having an annular wall radially spaced from said annular element and a cleaning material clamped between the annular wall and the annular element enveloping the cup member.

12. The combination of claim 1 including a cup member having an annular wall radially spaced from said body and a cleaning material clamped between the annular wall and the body enveloping the cup member.

13. The combination of claim 12 wherein said retaining means comprises a flexible envelope enclosing the blades, said envelope having an opening through which the shank extends in axially spaced relation to the body, and annular anchoring means formed on the body for securing the envelope thereto.

14. A mounting attachment for a beater having a shank and a plurality of blades of a predetermined curvature interconnected in intersecting relation to one end of the shank, comprising a tubular member having a predetermined cross-sectional shape, core means connected to one axial end of the tubular member for cross-sectionally rigidifying the tubular member adjacent said one end to limit angular displacement of the blades relative to the tubular member, a shock-absorbing spacer lining the tubular member in engagement with the blades and conforming to the curvature thereof.

15. The combination of claim 14 wherein said core means comprises a rigid block mounted internally of the tubular member at said one end in abutting relation to the spacer, and fastening means connecting the block to the tubular member.

16. The combination of claim 14 wherein said core means comprises a rigid block having a recess receiving said tubular member at said one end and fastening means securing the block to the tubular member.

17. The combination of claim 1 wherein said cavity is formed by intersecting slots of a width substantially equal to the width of the blades, each of said slots having a laterally extending portion receiving the blades when the body is twisted on the beater thereby locking the body to the blades of the beater, a working implement drivingly connected to said body, said working implement and body having mating ribs and grooves forming a positive drive connection between the body and working implement, said body including a locking member exposed to the bottom surface thereof for detachable locking engagement with a fastener for securing various working implements to the body.

18. The combination of claim 1 wherein said blade engaging means comprises rigid blade engaging surfaces in the body conforming to the curvature of the blades.

19. The combination of claim 1 wherein said blade engaging means comprises a shock-absorbing spacer in the body conforming to the curvature of the blades.

20. A mounting attachment for a beater having a shank and a plurality of blades of a predetermined external surface curvature interconnected at one end of the shank comprising an axially elongated body having a torque transmitting cavity receiving said beater therein for a substantial axial distance from said one end of the shank, torque transmitting means within the body projecting radially between the blades for lateral engagement therewith having blade contacting surfaces conforming to and contacting said external surface curvature of the blades while transmitting torque, and retaining means surrounding the torque transmitting means and the blades for holding said blade engaging means in contact with the blades substantially along all of said contacting surfaces.

References Cited

UNITED STATES PATENTS

| | | | |
|---|---|---|---|
| 2,496,972 | 2/1950 | Wolfe | 51—241 XR |
| 2,822,562 | 2/1958 | Shackelford | 15—230.16 |
| 3,141,184 | 7/1964 | Notes | 15—97 |
| 3,186,020 | 6/1965 | Redfield | 15—230.19 |

DANIEL BLUM, *Primary Examiner.*

U.S. Cl. X.R.

15—28, 97, 180; 259—1